(12) United States Patent
Wu et al.

(10) Patent No.: US 8,473,957 B2
(45) Date of Patent: Jun. 25, 2013

(54) ARCHITECTURE FOR PROVIDING ON-DEMAND AND BACKGROUND PROCESSING

(75) Inventors: Yunxin Wu, Kirkland, WA (US); John Edward Gallardo, Woodinville, WA (US); Jingxiao Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 254 days.

(21) Appl. No.: 12/966,862

(22) Filed: Dec. 13, 2010

(65) Prior Publication Data

US 2012/0151489 A1    Jun. 14, 2012

(51) Int. Cl.
*G06F 9/46* (2006.01)
(52) U.S. Cl.
USPC .......................................................... 718/102
(58) Field of Classification Search
None
See application file for complete search history.

(56) References Cited

U.S. PATENT DOCUMENTS

| | | | |
|---|---|---|---|
| 2009/0125595 A1 | 5/2009 | Maes | |
| 2009/0320029 A1* | 12/2009 | Kottomtharayil | 718/102 |
| 2010/0241729 A1 | 9/2010 | Angelov | |

OTHER PUBLICATIONS

Jinesh Varia, "Amazon Simple Queue Service", Jul. 16, 2008, (12 pages).
Jim Wilson, "Microsoft .NET Compact Framework Background Processing Techniques", Mar. 2003, (8 pages).
Michele Leroux Bustamante, "IIS and WAS Hosting Architecture", Apr. 30, 2007, (8 pages).
Tim Dunn, "How to monitor system and WebSphere Business Integration Message Broker V5 resource use", Jun. 30, 2004, (18 pages).
Product: Gearman—Open Source Message Queuing System, Jan. 13, 2009, (7 pages).
Windows Message Processing and Multithreaded Programming 2, Jun. 7, 2006, (10 pages).

* cited by examiner

*Primary Examiner* — MengYao Zhe
(74) *Attorney, Agent, or Firm* — Workman Nydegger (57) ABSTRACT

Embodiments are directed to providing schedule-based processing using web service on-demand message handling threads and to managing processing threads based on estimated future workload. In an embodiment, a web service platform receives a message from a client that is specified for schedule-based, background handling. The web service platform includes an on-demand message handling service with processing threads that are configured to perform on-demand message processing. The web service platform loads the on-demand message handling service including the on-demand message handling threads. The web service platform implements the on-demand message handling service's threads to perform background processing on the received client message. The client messages specified for background handling are thus handled as service-initiated on-demand tasks.

20 Claims, 4 Drawing Sheets

ARCHITECTURE FOR PROVIDING ON-DEMAND AND BACKGROUND PROCESSING

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, web browsers may interact with web servers to request and receive data which is presented to a user. These web servers may be configured to provide web services. Such web services are typically designed to provide interactive or on-demand processing. As such, the web services fail to provide schedule-based, background processing.

BRIEF SUMMARY

Embodiments described herein are directed to providing schedule-based processing using web service on-demand message handling threads and to managing processing threads based on estimated future workload. In one embodiment, a web service platform receives a message from a client that is specified for schedule-based, background handling. The web service platform includes an on-demand message handling service with processing threads that are configured to perform on-demand message processing. The web service platform loads the on-demand message handling service including the on-demand message handling threads. The web service platform implements the on-demand message handling service's threads to perform background processing on the received client message. The client messages specified for background handling are thus handled as service-initiated on-demand tasks.

In another embodiment, a web service platform receives a message from a client that is specified for schedule-based, background handling. The web service platform includes an on-demand message handling service with non-terminating processing threads that are configured to perform on-demand message processing. The non-terminating on-demand message handling threads implement one-way messages to propel a polling loop that polls for background processing work items. The web service platform loads the on-demand message handling service including the on-demand message handling threads. The web service platform implements the on-demand message handling service's threads to perform background processing on the received client message. The client messages specified for background handling are thus handled as service-initiated on-demand tasks. The web service platform also estimates a future workload for the web service platform based on at least one of current and past polling loop activity and suspends background processing based on the estimated future workload.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to providing schedule-based processing using web service on-demand message handling threads and to managing processing threads based on estimated future workload. In one embodiment, a web service platform receives a message from a client that is specified for schedule-based, background handling. The web service platform includes an on-demand message handling service with processing threads that are configured to perform on-demand message processing. The web service platform loads the on-demand message handling service including the on-demand message handling threads. The web service platform implements the on-demand message handling service's threads to perform background processing on the received client message. The client messages specified for background handling are thus handled as service-initiated on-demand tasks.

In another embodiment, a web service platform receives a message from a client that is specified for schedule-based, background handling. The web service platform includes an on-demand message handling service with non-terminating processing threads that are configured to perform on-demand message processing. The non-terminating on-demand message handling threads implement one-way messages to propel a polling loop that polls for background processing work items. The web service platform loads the on-demand message handling service including the on-demand message handling threads. The web service platform implements the on-demand message handling service's threads to perform background processing on the received client message. The client messages specified for background handling are thus handled as service-initiated on-demand tasks. The web service platform also estimates a future workload for the web service platform based on at least one of current and past polling loop activity and suspends background processing based on the estimated future workload.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks (e.g. cloud computing, cloud services and the like). In a distributed system environment, program modules may be located in both local and remote memory storage devices.

Figure 1:
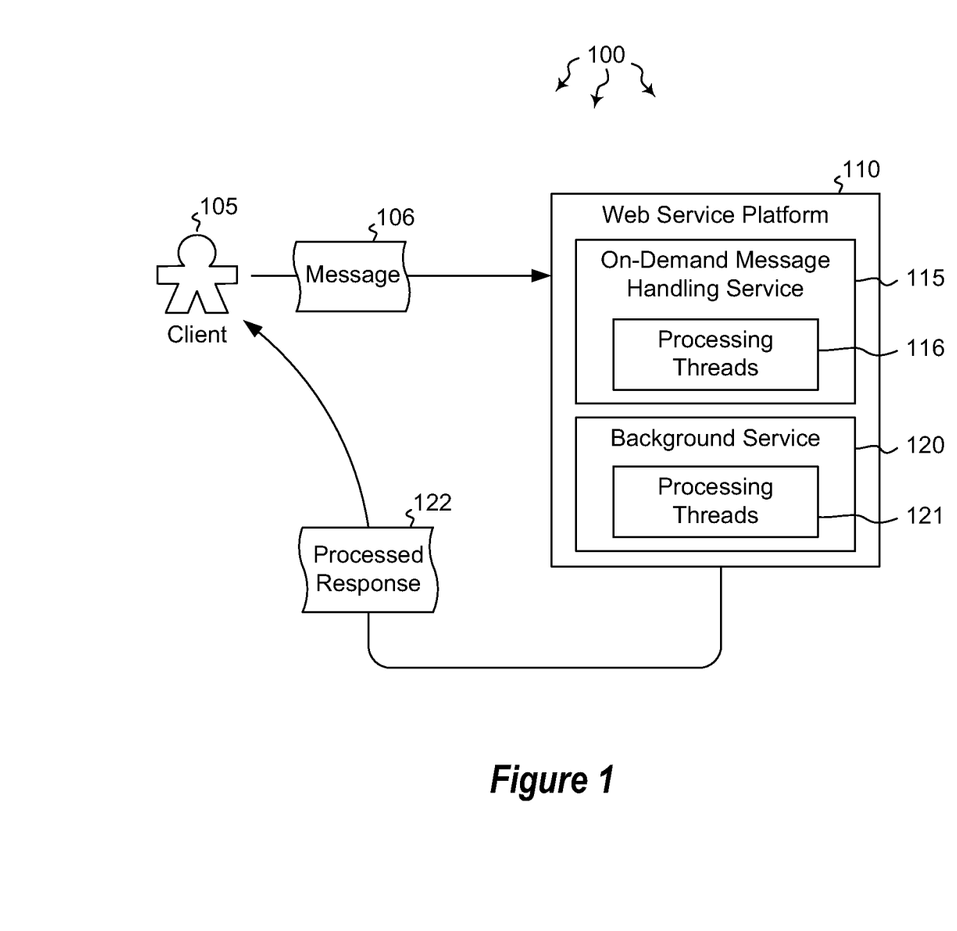
FIG. 1 illustrates a computer architecture in which embodiments of the present invention may operate including providing schedule-based processing using web service on-demand message handling threads.

FIG. 1 illustrates a computer architecture 100 in which the principles of the present invention may be employed. Computer architecture 100 includes web service platform 110. Web service platform 110 may be any type of distributed or local computing system that is configured to provide web services, data processing or other internet-related functions. The web service platform may be provided by a cloud computing system that is distributed over a plurality of different computer systems. The web service platform may include an on-demand message handling service 115 that is configured to process on-demand messages. For instance, on-demand message 106 may be received from client 105. The client may send message 106 indicating that the client wishes to access a web service provided by the web service platform.

The on-demand message handling service 115 may include multiple different processing threads 116. These processing threads may be used to process various aspects of a web service, software program or other software function, or in processing the received message. Web service platform 110 may also include a background service 120 that includes processing threads 121 for processing background tasks. In some cases, the on-demand message handling service's threads may be used to perform background processing on client message 106. In this manner, client messages specified for background handling are handled as service-initiated on-demand tasks, where the results from the processing (e.g. processed response 122) are sent back to the client.

Background processing by service 120 may include periodic actions and work items polled from a set of queues. The queues may be populated by external schedulers, on-demand client requests, and work items themselves. Such polling may be performed on a continual basis through periodic calls to a remote messaging interface (in some cases, similar to web services for on-demand requests) from an external component. Each call may execute continuously until the next call. This converts pushes from the external component to the service tier into pulls and periodic actions inside the service tier. Background processing threads may be activated by the web service platform upon receiving client messages. Using these client messages, the client pushes the web service platform 110 to perform background processing. The web service platform then converts the client's pushes into its own pulls of work items.

In some cases, the web service platform calculates when the next work item will arrive, and compares that time with the current time. If the difference is sufficiently large, background processing will be suspended, since the cost of keeping it running for that large amount of time is higher than the cost of restarting the background processing. To ensure that the work item will be processed when it arrives, the client 105 sends a message to start background processing before then. For scheduled work items, the web service platform and the client may use similar methods to calculate the time of the very next work item, based on the schedule definitions of all the work items currently in queue.

As mentioned above, on-demand message processing threads 116 may be used for background processing. The on-demand message threads for background processing may be non-terminating. Background processing may reinitialize after failures through a web service request loop generated by the client. A message loop may send messages to the web service platform to perform background processing as interrupts. Interrupts may further be used to avoid hitting timeout thresholds set by the web service platform to control how long an individual message can be processed by the web service platform. In other words, it avoids having a single message consume resources for too long. A single logical loop may be implemented for background work item polling which continues across multiple messages (e.g. 106). The message loop and background processing may be suspended based on a determination of future workload. Work may be distributed to all nodes hosting background processing through random addressing, load balancing and/or message bouncing. A message initiator domain may be provided which may increase the reliability of background processing threads through message distribution. Processing threads may have identical characteristic so that each can process work items. A unified architecture for interactive/on-demand processing and background/scheduled processing may also be provided which shares common features in the areas such as activation, health monitoring, resource recycles, deployment and hosting.

Background processing workers are hosted in the same process hosting interactive web services. An independent operating timer periodically sends a message to the process through a remote messaging interface. A message arriving at a worker results in a thread that initialize the background processing and performs work item polling. The thread will run until another message arrives. If such a thread terminate due to failure, or does not yield to a new message in time, the new message will reinitialize the background processing. This ensures its availability. Even if time allowed for a single message is limited, the background processing can run infinitely.

In some cases, a single infinite loop is used to poll work items. The loop may span multiple message threads. The loop yields a return in each iteration, while each thread iterates through the yield returns of the loop, checking signals set by newer messages. In some cases, a single thread may consume data returned by the loop.

The messages may be sent to different nodes randomly or through a load balancer. The message initiator and the poll of workers may be separated, allowing fault tolerance of individual threads and scalability. To ensure messages reach the threads, even when direct exhaustive addressing is not possible (for example, if messages have to go through a load balancer), message bouncing may be utilized. In some cases, messages may be given a minimum life expectancy. When a new message arrives, if the current message has not exceeded its minimum life expectancy, it will send another message out to the load balancer, which has a reduced life expectancy of the remainder of the current one.

In some embodiments, separate processes for background processing are not implemented so that shared components between the interactive web service and background processing may be deployed and configured once, in one place and through the same user interface. Components specific to background processing may be deployed and configured the same way as other components. Features available to web service on-demand threads 116 through the web service platform 110 may be available to background processing threads 121 as well. These concepts will be explained in greater detail below with regard to method 200 of FIG. 2.

Figure 2:
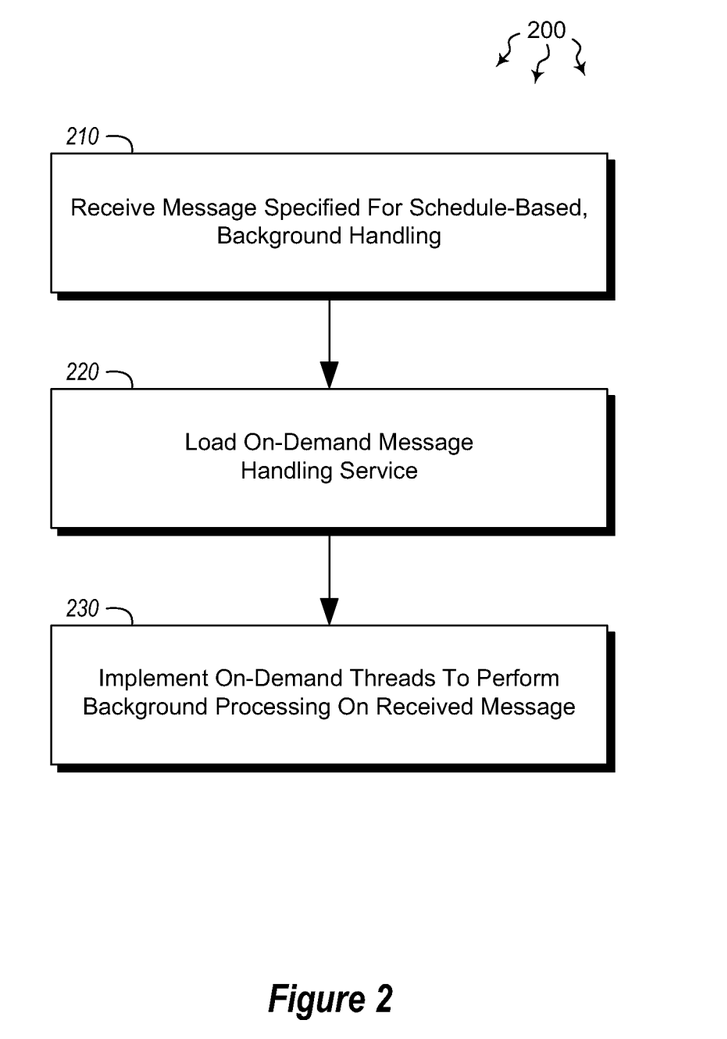
FIG. 2 illustrates a flowchart of an example method for providing schedule-based processing using web service on-demand message handling threads.
Figure 3:
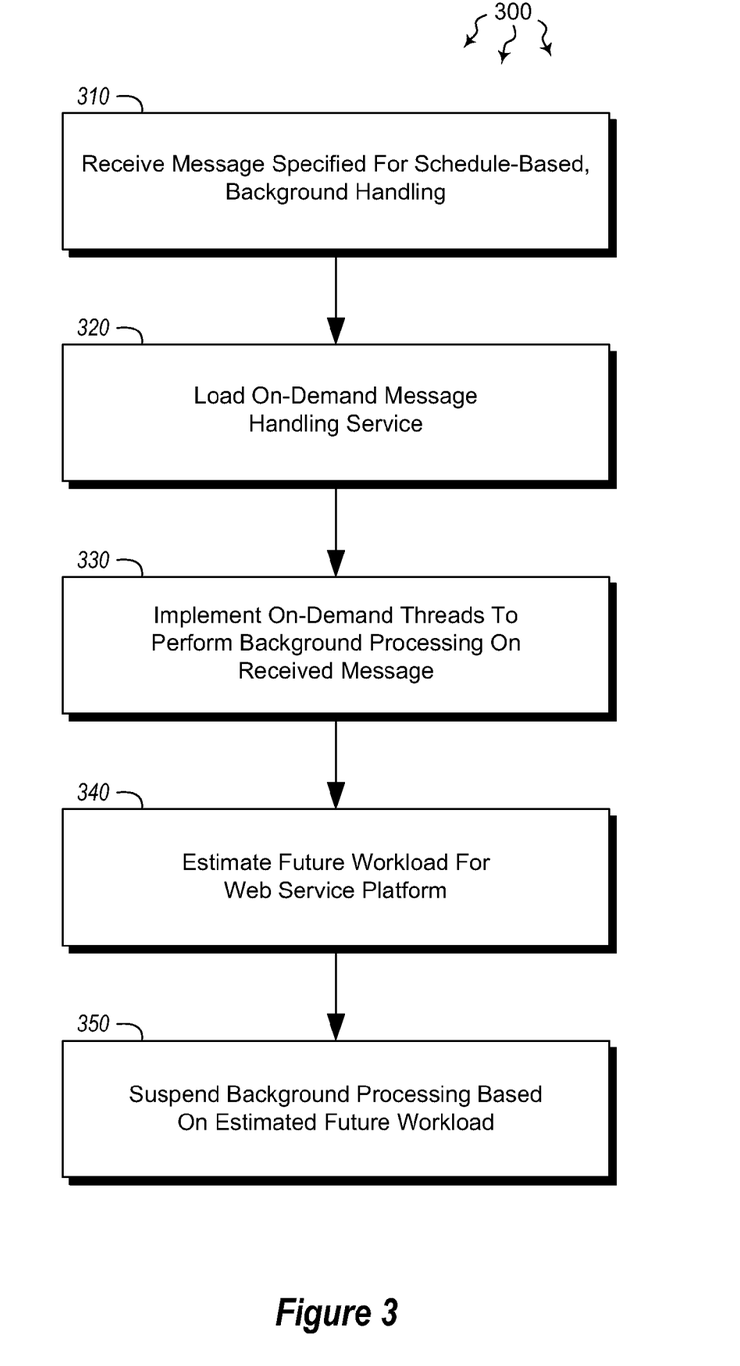
FIG. 3 illustrates a flowchart of an example method for managing processing threads based on estimated future workload.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing schedule-based processing using web service on-demand message handling threads. The method 200 will now be described with frequent reference to the components and data of environments 100 and 400 of FIGS. 1 and 4, respectively.

Method 200 includes an act of receiving at a web service platform a message from a client that is specified for schedule-based, background handling, wherein the web service platform includes an on-demand message handling service with one or more threads that are configured to perform on-demand message processing (act 210). For example, web service platform 110 may receive message 106 from client 105. The message may be specified for schedule-based, background handling. Schedule-based handling may refer to the processing of messages according to a certain schedule or queue, where each message is placed in line for processing at a certain time or in a certain order. The web service platform may include an on-demand message handling service 115 that performs on-demand message processing. As the name implies, the on-demand service uses processing threads 116 to process messages as they are received, and not according to a schedule as the background service is configured to do.

In some cases, both on-demand and background processing occur on a single host. Thus, in cases where the web service platform 110 is hosted on a single computer system, both the on-demand service 115 as well as the background service 120 may be hosted on the same computer system. In cases where the web service platform is hosted on multiple computer systems (such as on the cloud or in another distributed system), the on-demand service and the background service may be hosted on different computing systems.

In some embodiments, schedule-based background handling comprises both user-scheduled scheduling and system-scheduled scheduling. Thus, background service 120 may process message 106 based on a user-specified schedule or a system-specified schedule. The schedule may be customized or modified by the user or by different software programs.

The processing threads 121 of the background service may be allocated based on the user-defined or system-defined schedule.

Method 200 includes an act of the web service platform loading the on-demand message handling service including the on-demand message handling threads (act 220). For example, web service platform 110 may load on-demand handling service 115 including on-demand processing threads 116. These on-demand processing threads may be configured to process messages as they are received from various different clients and software systems. In some cases, the messages may include various work items. These work items may be distributed to a plurality of message processing threads. Thus, each work item may be processed by multiple different processing threads.

Method 200 includes an act of the web service platform implementing the on-demand message handling service's threads to perform background processing on the received client message, wherein client messages specified for background handling are handled as service-initiated on-demand tasks (act 230). For example, web service platform 110 may implement on-demand processing threads 116 to perform background processing on message 106. In this manner, client messages specified for background processing may be processed as service-initiated on-demand tasks.

Figure 4:
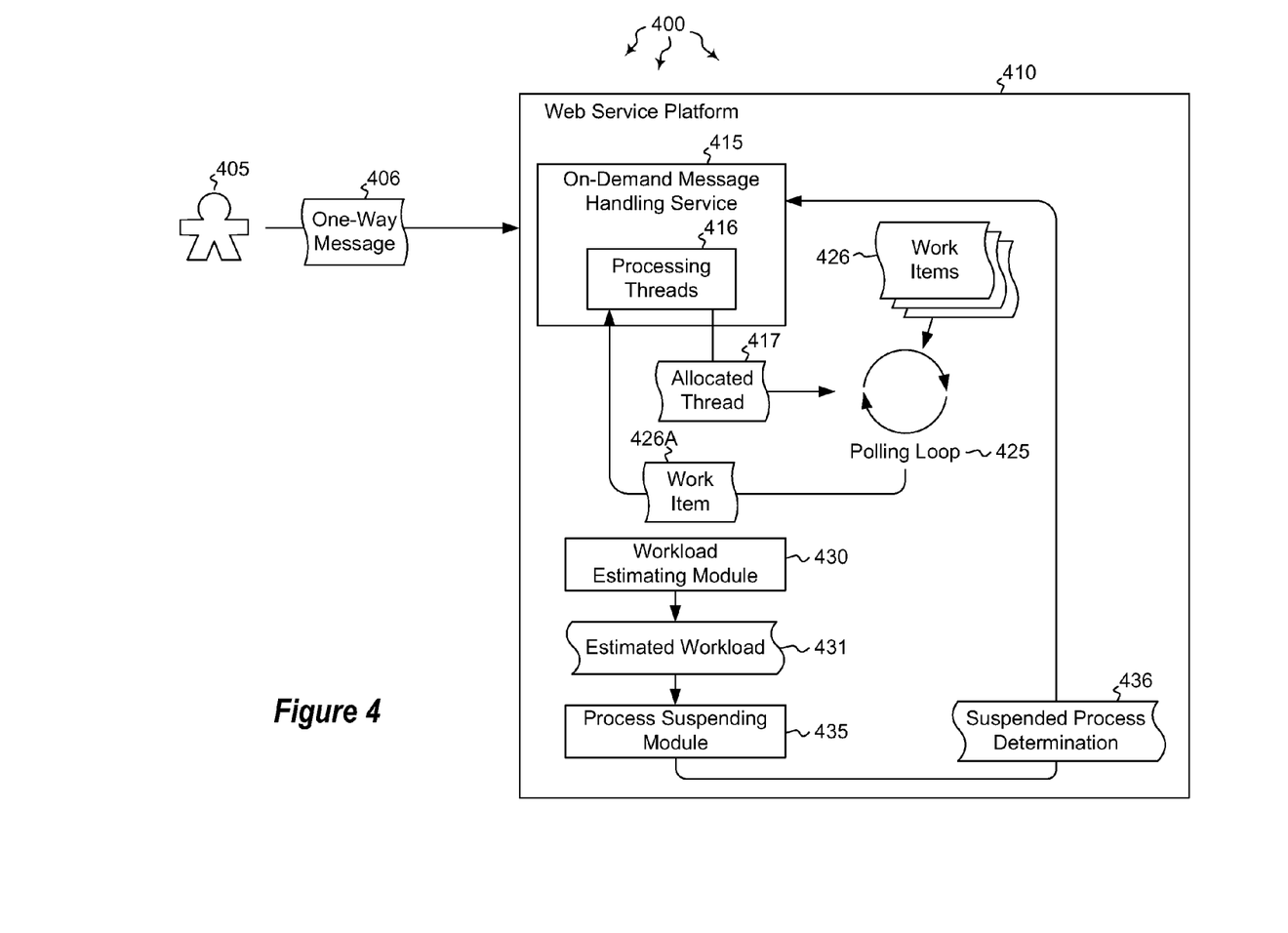
FIG. 4 illustrates a computer architecture in which embodiments of the present invention may operate including managing processing threads based on estimated future workload.

In some cases, the on-demand message handling threads 116 implemented for background processing are non-terminating. That is, the message threads will continue to run until another message arrives. Thus, the message threads continue processing a given message until a new message is received. The non-terminating on-demand message handling threads may allocate at least one thread to propel a polling loop that polls for background processing work items. For instance, as shown in FIG. 4, on-demand message handling service 415 may use at least one of processing threads 416 to propel polling loop 425. The loop is propelled to query work item queues to pull work items 426 from the queue. The pulled work items are 426A are then sent back to processing threads 416 for on-demand processing. The on-demand processing of messages specified for background handling may automatically reinitialize after occurrence of a failure. Thus, when a failure does occur, automatic reinitialization may ensure that processing is automatically returned to a normal operating state.

The client 405 may send one-way messages 406 to the on-demand processing threads as interrupts. These interrupts may be used to restart a timer that tracks how long a work item is taking to process. Using this tracked processing time, timeout thresholds typically imposed by the on-demand message handling service may be avoided. Accordingly, allocated thread 417 may start the polling loop or take it over from the thread that is performing the loop in a timely manner to ensure that the work items are properly processed. Thread 417 may also check the health of the polling loop and reinitialize it when needed. If the polling loop is healthy, the web service platform may take over the polling loop from the processing thread for the previous message, without any re-initialization steps. In some cases, the polling loop may include a logical loop that continues across multiple different messages. Background processing may be started in one or more computer nodes through any of the following: random addressing, load balancing and message bouncing.

As shown in FIG. 4, a workload estimating module 430 may estimate or otherwise determine a future workload for the web service platform 410 based on current and/or past polling loop activity. Thus, if polling activity has been heavy, module 430 can indicate that it expects a heavy future workload 431. Similarly, if polling activity has been light, module 430 can indicate that it expects a light future workload. This estimated future workload may be sent to process suspending module 435 which determines whether processes should be suspended based on the projected workload. In some cases, module 435 may indicate in suspended process determination 436 that at least a portion of background processing is to be suspended based on the estimated future workload.

FIG. 3 illustrates a flowchart of a method 300 for managing processing threads based on estimated future workload. The method 300 will now be described with frequent reference to the components and data of environments 100 and 400 of FIGS. 1 and 4, respectively.

Method 300 includes an act of receiving at a web service platform a message from a client that is specified for schedule-based, background handling, wherein the web service platform includes an on-demand message handling service with one or more non-terminating threads that are configured to perform on-demand message processing, and wherein the non-terminating on-demand message handling threads allocate at least one thread to propel a polling loop that polls for background processing work items (act 310). For example, web service platform 410 may receive one-way message 406 from client 405 that is specified for scheduled, background handling. The web service platform includes on-demand message handling service 415 with one or more non-terminating processing threads 416 that perform on-demand message processing.

As mentioned above, the non-terminating on-demand message processing threads may 417 to propel polling loop 425 forward. The loop 425, upon receiving the allocated thread 417 from the processing threads 416, queries a work item queue to pull work items 426 from the queue. Thus, the system acts in a "push" fashion where the on-demand processing threads drive the polling loop to query for and send work items 426A back to the processing threads. The threads may then process the work item received from the polling loop.

Method 300 includes an act of the web service platform loading the on-demand message handling service including the on-demand message handling threads (act 320). For example, web service platform 410 may load on-demand message handling service 415 which includes on-demand message handling threads 416. The on-demand message handling service's threads may be implemented to perform background processing on the received client message. The client messages specified for background handling are handled as service-initiated on-demand tasks (act 330). For instance, processing threads 416, although typically used to perform on-demand message processing, may be configured to process messages specified for background handling. The processing threads may send the allocated thread(s) to polling loop 425 to access these background work items. The work items may be accessed in response to received one-way message 406.

Method 300 also includes an act of estimating a future workload for the web service platform based on at least one of current and past polling loop activity (act 340). For example, workload estimating module 430 may estimate a future workload 431 for web service platform 415 based on current polling loop activity, past polling loop activity, or activity over a specified period of time that includes past and current activity. The estimated workload may be sent to process suspending module 435 which determines whether various processes should be suspended and, if processes are to be suspended, which processes should be suspended.

Method 300 includes an act of suspending at least a portion of background processing based on the estimated future workload (act 350). For example, process suspending module 435 may determine, based on the estimated future workload 431, that processing on one or more background work items is to be suspended for a period of time. In some cases, the web service platform 410 calculates when the next work item will arrive, and compares that time with the current time. If the difference is sufficiently large, background processing will be suspended, since the cost of keeping is running for that large amount of time is higher than the cost of restarting the background processing. To ensure that the work item will be processed when it arrives, the client 105 sends a message to start background processing before then. For scheduled work items, the client calculates the time of the very next work item, based on the schedule definitions of all the work items currently in queue The threshold level of processing for threads 416, as well as the suspension period, may be customized by a user. The work items that are to be processed (i.e. those that have not been suspended) may be distributed to various nodes hosting background processing through any of the following: random addressing, load balancing and message bouncing. Thus, distribution of work items may reliably implemented in the web service platform.

Accordingly, systems, methods and computer program products are provided which implement schedule-based work item processing using web service on-demand message handling threads. Moreover, systems, methods and computer program products are provided which manage the processing of threads based on estimated future workload.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a web service platform, a computer-implemented method for converting the manner in which client messages are handled for processing, so that client messages specified for background handling are handled instead as service-initiated on-demand tasks, the method comprising:
    an act of loading at a web service platform an on-demand message handling service with one or more threads that are configured to perform on-demand message processing, and a background message handling service with one or more threads that are configured to perform background processing of a message according to a schedule rather than as the message is received;
    an act of receiving at the web service platform a message from a client, the message specified for schedule-based, background handling;
    an act of determining at the web service platform that one or more threads of the on-demand message handling service are available to process at least one or more parts of the received message;
    an act of using one or more of the on-demand message handling service's threads to process the at least one or more parts of the received message as they are received rather than according to a schedule used to perform background processing on the received client message so that the received client message specified for background handling is instead handled at least in part as one or more service-initiated on-demand tasks;
    an act of at least one of the one or more on-demand message handling service's threads being allocated to propel a polling loop that polls for background processing work items;
    an act of estimating a future workload for the web service platform based on at least one of current and past polling loop activity; and
    an act of suspending at least a portion of background processing provided by the background message handling service based on the estimated future workload.

2. The method of claim 1, wherein both on-demand and background processing occur on a single host.

3. The method of claim 1, wherein the schedule-based background handling comprises both user-scheduled scheduling and system-scheduled scheduling.

4. The method of claim 1, wherein the on-demand message handling threads implemented for background processing are non-terminating.

5. The method of claim 4, wherein the non-terminating on-demand message handling threads allocate at least one message handling thread to propel a polling loop that polls for background processing work items.

6. The method of claim 5, wherein the polling loop queries one or more work item queues to pull work items from the queue.

7. The method of claim 6, wherein the polling loop provides pulled work items to processing threads chosen from a thread pool.

8. The method of claim 7, wherein the one-way client messages are sent to the processing threads as interrupts.

9. The method of claim 8, wherein the interrupts are used to restart a timer that tracks how long a work item is taking to process, such that timeout thresholds are avoided.

10. The method of claim 5, wherein the polling loop comprises a logical loop that continues across a plurality of messages.

11. The method of claim 5, further comprising an act of estimating a future workload for the web service platform based on at least one of current and past polling loop activity.

12. The method of claim 11, wherein at least a portion of background processing is suspended based on the estimated future workload.

13. The method of claim 11, wherein client requests are suspended based on the estimated future workload.

14. The method of claim 5, wherein background processing is started in one or more computer nodes through at least one of the following: random addressing, load balancing and message bouncing.

15. The method of claim 1, wherein work item messages are distributed to a plurality of message processing threads.

16. The method of claim 1, wherein on-demand handling of messages specified for background processing automatically reinitializes after occurrence of a failure.

17. A computer program product comprised of one or more physical storage media having stored thereon computer-executable instructions that, when executed by one or more processors, causes a computing system to perform a method for converting the manner in which client messages are handled for processing, so that client messages specified for background handling are handled instead as service-initiated on-demand tasks, and where the method comprises:
    an act of loading at a web service platform an on-demand message handling service with one or more non-terminating threads that are configured to perform on-demand message processing, and a background message handling service with one or more threads that are configured to perform background processing of a message according to a schedule rather than as the message is received;

an act of receiving at the web service platform a one-way message from a client, the message specified for schedule-based, background handling;

an act of determining at the web service platform that one or more threads of the on-demand message handling service are available to process at least one or more parts of the received message; and an act of using one or more of the on-demand message handling service's threads to process the at least one or more parts of the received message as they are received rather than according to a schedule used to perform background processing on the received client message so that the received client message specified for background handling is instead handled at least in part as one or more service-initiated on-demand tasks;

an act of at least one of the one or more on-demand message handling service's threads being allocated to propel a polling loop that polls for background processing work items;

an act of estimating a future workload for the web service platform based on at least one of current and past polling loop activity; and an act of suspending at least a portion of background processing provided by the background message handling service based on the estimated future workload.

18. The computer program product of claim 17, wherein background processing is started in one or more computer nodes through at least one of the following: random addressing, load balancing and message bouncing.

19. The computer program product of claim 17, wherein the polling loop queries one or more work item queues to pull work items from the queue.

20. A computer system comprising the following:

one or more processors;

system memory;

one or more physical storage media having stored thereon computer-executable instructions that, when executed by the one or more processors, causes the computing system to perform a computer-implemented method for converting the manner in which client messages are handled for processing, so that client messages specified for background handling are handled instead as service-initiated on-demand tasks, the method comprising the following:

an act of loading at a web service platform an on-demand message handling service with one or more threads that are configured to perform on-demand message processing, and a background message handling service with one or more threads that are configured to perform background processing of a message according to a schedule rather than as the message is received;

an act of receiving at the web service platform a message from a client, the message specified for schedule-based, background handling;

an act of determining at the web service platform that one or more threads of the on-demand message handling service are available to process at least one or more parts of the received message;

an act of using one or more of the on-demand message handling service's threads to process the at least one or more parts of the received message as they are received rather than according to a schedule used to perform background processing on the received client message so that the received client message specified for background handling is instead handled at least in part as one or more service-initiated on-demand tasks;

an act of at least one of the one or more on-demand message handling service's threads being allocated to propel a polling loop that polls for background processing work items;

an act of estimating a future workload for the web service platform based on at least one of current and past polling loop activity; and an act of suspending at least a portion of background processing provided by the background message handling service based on the estimated future workload.

* * * * *